April 19, 1927.

J. C. BAKER

METHOD OF MAKING BREAKER ARMS

Filed June 17, 1925

1,625,697

Inventor
John C. Baker
Williams, Bradbury,
McCaleb & Hinkle
attys.

Patented Apr. 19, 1927.

1,625,697

UNITED STATES PATENT OFFICE.

JOHN C. BAKER, OF LAKE BLUFF, ILLINOIS, ASSIGNOR TO FANSTEEL PRODUCTS COMPANY, INC., OF NORTH CHICAGO, ILLINOIS, A CORPORATION OF NEW YORK.

METHOD OF MAKING BREAKER ARMS.

Application filed June 17, 1925. Serial No. 37,632.

My invention relates to breaker arms and the like, such for instance, as are used in circuit breakers of automobile ignition systems,—and to the method of welding the contacts to the arms.

The general objects of my invention are an improved weld between the contact and the breaker arm and the simplifying of the manufacture to reduce the labor costs and to minimize the percentage of losses in the assembling and welding processes.

Another object is to make practicable the use of a welding medium which will effect better securement of the contact to the arm than does the copper welding medium usually employed. In the usual form of breaker arm heretofore manufactured, the arm has been provided with a raised spot of about the same diameter as the contact, and the contact has been welded to this raised spot or table. Copper in the form of a very thin wafer has been used as the welding medium. Copper does not give as perfect a weld but it was found that copper alone of all mediums which would satisfactorily weld the tungsten or similar contact to the nickeled steel arm, had the necessary capillary property of floating the contact to the center of the raised spot. This was relied on to center the disc.

My invention contemplates the use of a depression in the arm for mechanically centering the contact and permitting the use of a more effective welding medium than copper alone although not having the centering property of the copper.

Another advantage of welding the contact to a depressed spot in the arm is that in the process of manufacture the superposed contact, being mechanically centered, has less tendency to jar out of position before welding. In fact, the breaker arm itself forms the welding jig.

A further feature of my invention is the improved welding alloy which I employ.

These and further objects, features and advantages of my invention are set forth in the following description of a breaker arm made in accordance with my invention.

Figure 3:
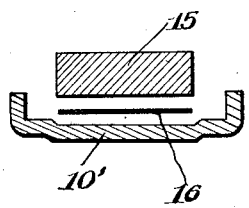
Figure 3 is a view similar to Figure 2 but showing the elements in their disassociated position just prior to assembling.
Figure 1:
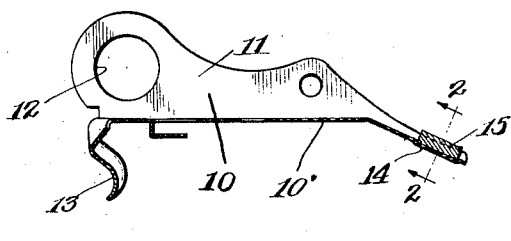
Figure 1 is a horizontal longitudinal section taken along the medial line of a contact arm.
Figure 2:
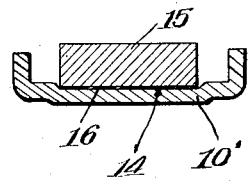
Figure 2 is a transverse vertical section taken on the line 2—2 of Figure 1.

The breaker arm 10 here shown is of the type used in the circuit breaker of a standard automobile ignition system. It is stamped from sheet steel and preferably nickeled to prevent rust. The arm is in the general form of a channel, the flanges 11 at one end having holes 12 for the pivot pin while the same end of the web 10' has an offset 13 providing anchorage for the spring. At the free end of the arm, the web 10' is provided with a depression 14 instead of the raised spot or table customarily provided. The contact 15 is a disc of tungsten or other suitable metal having a diameter substantially the same as that of the depression 14 so that when the contact is placed in the depression, the depression acts as a jig to center the contact in its proper place on the web of the arm. A very thin disc 16 of a welding medium is first placed in the depression and the contact 15 placed over it. The wafer 16 and the contact are thus held properly centered on the arm and will withstand the jarring incident to carrying the assembled devices into the welding furnace.

The disc 16 is made from a welding medium which is preferably one giving a more perfect weld than does the copper. The alloy which I have found to be most effective for my purpose contains:

| | Per cent. |
|---|---|
| Silver | 60 |
| Zinc | 20 |
| Copper | 15 |
| Nickel | 5 |

I have found that copper is desirable because of its apparent property of holding the silver and nickel together which otherwise tend to segregate. Of course other alloys may be used with satisfactory results.

Because my way of making these breaker arms eliminates the delicate operation of placing the contact on the arm and holding it there uncentered while the arm is carried about, or providing delicate and expensive jigs, I can materially reduce the labor cost in the manufacture of my arms and also eliminate to a large extent the losses due to imperfect products which result from the use of the inferior welding medium copper, and from the mal-alignment of the contact on the arm.

Another feature of my invention is that, if desired, instead of relying merely on the weight of the contact to hold it against the arm during the welding operation, a positive pressure may be placed on the contact, since my contacts which are mechanically centered in the depressions 14 insure that the contact is properly centered when such pressure is applied. In the case where the contact is welded to a raised spot, the contact might be jarred out of alignment before the pressure is placed on the contact, and after the pressure is applied to the contact, it precludes the copper from floating the contact back to the center of the raised spot. While I prefer to use the before-described alloy or some other medium more effective than copper, I contemplate that copper may be used if desired,—especially where the positive pressure is used as just described. In such case the capillary property of the copper cannot float the contact up the edge of the depression and out of center.

While I have described this particular embodiment of my invention, I contemplate that changes may be made without departing from the scope or spirit of my invention.

I claim:

1. The method of fixing a contact member to a breaker arm, which consists in forming a depression in the arm, placing a disc of metallic welding medium in said depression, the thickness of said disc being less than the depth of said depression, placing a contact member above said disc, and then subjecting the arm, contact member and disc to a welding heat while so positioned that the weight of said contact member is the sole means which maintains said member in said depression.

2. The method of welding a contact member to a breaker arm; which consists in providing a depression in the arm, placing a wafer of metallic welding medium in said depression, placing a contact member on said wafer, and then welding the contact member to the bottom of the depression while the weight of said contact member constitutes the sole means for centering said member in said depression.

3. The method of welding a contact member to a breaker arm which consists in forming a depression in the arm of about the diameter of the contact member, mechanically centering the contact member in the depression with a wafer of an alloy of silver, nickel and zinc, and then welding the contact member to the arm through the medium of said alloy, said contact member being maintained in position solely by the action of gravity in maintaining said contact member in said depression.

4. The method of fixing a contact member to a breaker arm, which consists in forming a depression in the arm, placing a wafer of welding medium in said depression, the thickness of said wafer being less than the depth of said depression, placing a contact member in said depression and on said wafer, the thickness of the contact member being such as to cause said contact member to project above the surface surrounding said depression, and welding said contact member to said breaker arm while said contact member is retained in said depression solely by the action of gravity.

In witness whereof, I hereunto subscribe my name this 15th day of June, 1925.

JOHN C. BAKER.